United States Patent
Mizutani et al.

(10) Patent No.: US 9,991,928 B2
(45) Date of Patent: Jun. 5, 2018

(54) COMMUNICATION SYSTEM AND WORK VEHICLE

(71) Applicant: Komatsu Ltd., Minato-ku, Tokyo (JP)

(72) Inventors: Eiji Mizutani, Hiratsuka (JP);
Takayuki Koshi, Hiratsuka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days. days.

(21) Appl. No.: 15/514,158

(22) PCT Filed: Feb. 27, 2015

(86) PCT No.: PCT/JP2015/055995
§ 371 (c)(1),
(2) Date: Mar. 24, 2017

(87) PCT Pub. No.: WO2016/135982
PCT Pub. Date: Sep. 1, 2016

(65) Prior Publication Data
US 2017/0294938 A1    Oct. 12, 2017

(51) Int. Cl.
*H04B 1/38* (2015.01)
*H04B 1/59* (2006.01)
(Continued)

(52) U.S. Cl.
CPC ............... *H04B 1/59* (2013.01); *G07C 5/008* (2013.01); *G08G 1/127* (2013.01); *H04B 1/3822* (2013.01);
(Continued)

(58) Field of Classification Search
CPC .................. H04B 1/3805; H04B 1/59

USPC ........ 455/550.1, 557, 41.1–41.3, 445, 575.9, 455/575.1, 414.1–414.4, 456.1–457, 455/422.1, 403, 412.1, 412.2, 426.1,
(Continued)

(56) References Cited

U.S. PATENT DOCUMENTS 5,635,693 A * 6/1997 Benson .................. G07B 15/04
340/10.33
2010/0013594 A1    1/2010 Komine et al.
2013/0325288 A1   12/2013 Komine et al.

FOREIGN PATENT DOCUMENTS

| JP | 2008-025234 | 2/2008 |
| JP | 2010-282267 | 12/2010 |
| JP | 2011-258234 | 12/2011 |

OTHER PUBLICATIONS

International Search Report in International Application No. PCT/JP2015/055995, dated May 26, 2015, 8 pages, with English translation.
(Continued)

*Primary Examiner* — Keith Ferguson
(74) *Attorney, Agent, or Firm* — Fish & Richardson P.C.

(57) ABSTRACT

A communication system provided to a working vehicle includes: an information receiving unit that communicates with identification devices and receives identification information; a first area information storage that stores first area information indicating an area where use of the information receiving unit is permitted; a comparing unit that compares the first area information with second area information indicating an area where the working vehicle is used; and a communication control unit that prohibits the information receiving unit from outputting electric waves when the second area information is not included in the first area information.

8 Claims, 12 Drawing Sheets

(51) Int. Cl.
   *G07C 5/00*      (2006.01)
   *G08G 1/127*     (2006.01)
   *H04B 1/3822*    (2015.01)
   *H04B 1/3827*    (2015.01)
   *H04W 4/02*      (2018.01)
   *B60W 50/04*     (2006.01)
   *B60W 50/02*     (2012.01)
   *G07C 5/08*      (2006.01)

(52) U.S. Cl.
   CPC ............ *H04B 1/3827* (2013.01); *H04W 4/02* (2013.01); *B60W 50/0205* (2013.01); *B60W 50/045* (2013.01); *B60W 2050/046* (2013.01); *G07C 5/085* (2013.01)

(58) Field of Classification Search
   USPC .................. 455/426.2, 26.1, 39; 701/2, 495; 340/572.1, 5.2
   See application file for complete search history.

(56) References Cited

OTHER PUBLICATIONS

International Preliminary Report on Patentability in International Application No. PCT/JP2015/055995, dated Aug. 29, 2017, 5 pages (with English translation).

\* cited by examiner

COMMUNICATION SYSTEM AND WORK VEHICLE

CROSS-REFERENCE TO RELATED APPLICATIONS

This application claims priority to International Application No. PCT/JP2015/055995 filed on Feb. 27, 2015, the contents of which are incorporated herein in their entirety.

TECHNICAL FIELD

The present invention relates to a communication system and a working vehicle provided with the communication system.

BACKGROUND ART

A construction machine (e.g., a hydraulic excavator and a wheel loader), a delivery vehicle (e.g., a dump truck), an industrial vehicle (e.g., forklift) and the like are typically known as a working vehicle. There is known technology of attaching a wireless tag (identification device) to a replacement part (e.g., a filter) installed in such a working vehicle, reading information stored in the wireless tag using a reader, and identifying the replacement part as a genuine part or an imitation (see, for instance, Patent Literature 1).

In parts monitoring equipment disclosed in Patent Literature 1, when the replacement part (e.g., a filter) is replaced or when the information (e.g., information about a part number) stored in the wireless tag of each of the parts is acquired through the reader at an operation of an engine switch and any one of the parts is identified as an imitation based on the acquired information about the part number, a controller outputs an alarm signal to stop the operation of the engine or display an alarm message on a monitor.

CITATION LIST

Patent Literature(s)

Patent Literature 1: JP-A-2008-25234

SUMMARY OF THE INVENTION

Problem(s) to be Solved by the Invention

Since a reading device (a so-called reader) outputs electric waves to the wireless tag, it is required to use a reader authorized under regulations about output of electric waves under Radio Law and the like in a country and an area where the working vehicle is used (hereinafter, referred to as an area). For this reason, when the working vehicle is manufactured in a factory and shipped toward an area where the working vehicle is to be used, a reader authorized in the area has to be provided to the working vehicle.

However, when the working vehicle is resold or rented, the working vehicle may be used in other areas. In such a case, when the reader installed in the working vehicle is not authorized in an area where the working vehicle is used, such an unauthorized reader (a communication device) outputs electric waves in the area where the working vehicle is used.

An object of the invention is to provide a communication system capable of easily prohibiting output of electric waves unauthorized at least in an area where a working vehicle is used, and a working vehicle.

Means for Solving the Problem(s)

According to an aspect of the invention, a communication system provided to a working vehicle includes: an information receiving unit that outputs electric waves to communicate with an identification device in which identification information is stored, and receives the identification information; a first area information storage that stores a first area information indicating an area where a use of the information receiving unit is permitted; a comparing unit that compares the first area information with a second area information indicating the area where the working vehicle is used; and a communication control unit that prohibits the information receiving unit from outputting the electric waves when the comparing unit judges that the second area information is not included in the first area information.

According to the above aspect of the invention, the information receiving unit outputs the electric waves to the identification device and reads the identification information stored in the identification device. At this time, the comparing unit compares the first area information indicating the area where the use of the information receiving unit provided to the working vehicle is permitted with the second area information indicating the area where the working vehicle (i.e., the information receiving unit) is actually used and judges whether or not the second area information is included in the first area information. When the second area information is included in the first area information, the communication control unit permits the information receiving unit to output electric waves. When only a single piece of the first area information is stored and the second area information is the same as the first area information, a judging unit judges that the second area information is included in the first area information and the communication control unit permits the information receiving unit to output the electric waves.

Accordingly, by correctly setting the area where a hydraulic excavator is used as the second area information, the information receiving unit can be reliably prevented from erroneously outputting electric waves in an area where the use of information receiving unit is not permitted. Consequently, the information receiving unit can be easily prohibited from outputting the electric waves unauthorized in the area where the working vehicle is used.

In the communication system according to the above aspect of the invention, when an instruction to acquire the identification information is inputted, preferably, the comparing unit judges whether or not the second area information is included in the first area information stored in the first area information storage, the communication control unit permits the information receiving unit to output the electric waves when the comparing unit judges that the second area information is included in the first area information, and the communication control unit prohibits the information receiving unit from outputting the electric waves when the comparing unit judges that the second area information is not included in the first area information.

With this arrangement, when acquisition of the identification information is instructed, the comparing unit judges whether or not the second area information is included in the first area information. The communication control unit that controls the output of the electric waves of the information receiving unit controls permitting or prohibiting the output of the electric waves based on a judgment result of the judging unit.

Accordingly, the output of the electric waves can be controlled to be permitted or prohibited based on the latest current position information (second area information) when the acquisition of the identification information is instructed. Moreover, also when a plurality of information receiving units are provided, the first area information storage, the comparing unit, and the communication control unit are prepared for each of the information receiving units, so that the output of the electric waves to each of the information receiving units can be controlled. In other words, by configuring the information receiving unit, the first area information storage, the comparing unit and the communication control unit as a single communication device, even when a plurality of communication devices are provided, the output of the electric waves can be controlled to each of the communication devices. Accordingly, in an arrangement in which two kinds of information receiving units (communication devices) are provided to a single working vehicle, when one of the information receiving units is not permitted in an area where the working vehicle is used, the one of the information receiving units can be reliably prohibited from outputting electric waves.

The communication system according to the above aspect of the invention preferably further includes an input device that selects a service mode in which a maintenance of the working vehicle is performed, in which the second area information is inputted using the input device with the service mode being selected.

With this arrangement, by setting the service mode to operate maintenance, a register operation of the second area information can be conducted only by a maintenance engineer. Accordingly, the operator of the working vehicle can operate the information receiving unit only in a permitted area without a complicated setting operation.

The communication system according to the above aspect of the invention preferably further includes a current position detector that detects the area where the working vehicle is used, in which the second area information is set based on the area detected by the current position detector.

Herein, a detector usable as the current position detector is exemplified by a detector that detects a current position of the working vehicle by receiving a satellite signal transmitted from a GPS (Global Positioning System) satellite; and a detector that detects a current position of the working vehicle by recognizing a communication base station of a mobile phone network and the like when the working vehicle communicates with the management server using the mobile phone network and the like.

With this arrangement, since the current position of the working vehicle can be detected by the current position detector, the second area information can be automatically set. Accordingly, since it is not necessary for the maintenance engineer to manually set the second area information, working performance can be improved. Further, since the current position of the working vehicle can be automatically detected, the second area information can be correctly set without being erroneously inputted.

In the communication system according to the above aspect of the invention, the working vehicle preferably includes: a communication device; and an instructing unit that instructs the communication device to acquire the identification information, the communication device comprises: an instruction judging unit that receives and judges the instruction to acquire the identification information; the information receiving unit; the first area information storage; the comparing unit; the communication control unit; and an information transmitter that transmits the acquired identification information, and the instructing unit comprises: a second area information storage that stores the second area information; a second communication control unit that outputs the instruction to acquire the identification information and the second area information to the communication device; and a second reception judging unit that judges whether or not the information is received from the communication device.

With this arrangement, the instructing unit includes the second area information storage. The second communication control unit of the instructing unit outputs to the communication device the second area information stored in the second area information storage and the instruction to acquire the identification information (also occasionally referred to as the information acquisition instruction). Accordingly, the instructing unit only needs to additionally output the second area information when acquiring the identification information but does not need to judge in which area the communication device is usable, so that complication of an information acquisition process is preventable.

In addition to the information receiving unit for outputting the electric waves, the communication device includes the instruction judging unit, the first area information storage, the comparing unit and the communication control unit. When the instruction judging unit judges the output from the instructing unit, the comparing unit compares the first area information with the second area information and the communication control unit controls permitting or prohibiting the output of the electric waves based on the comparison result. Since the control of permitting or prohibiting the output of the electric waves is actually conducted by the communication device as described above, the communication device can correctly set the first area information in the information receiving unit, so that the communication device can correctly control permitting or prohibiting the output of the electric waves.

In the communication system according to the above aspect of the invention, preferably, the communication device of the working vehicle includes a first communication device and a second communication device, the first communication device further includes a second communication device control unit that controls the second communication device, the second communication control unit of the instructing unit outputs the instruction to acquire the identification information and the second area information to the first communication device, the second communication device control unit of the first communication device outputs the instruction to acquire the identification information, which is outputted from the instructing unit, and the second area information to the second communication device, and the second communication device includes an information transmitter that transmits the information to the first communication device.

With this arrangement, two kinds of communication devices are provided. The second communication device is controlled by the second communication device control unit of the first communication device. Particularly, with this arrangement, in case where three or more of the communication devices are provided, one of the communication devices is the first communication device and the rest of the communication devices are controllable as the second communication devices. Accordingly, the instructing unit only needs to output the information acquisition instruction and the second area information only to the first communication device. As compared with an instance where the instructing unit directly controls the first and second communication devices, the control by the instructing unit can be simplified.

Moreover, the instructing unit can output the same command to each of the communication devices. Accordingly, as compared with an instance where the instructing unit recognizes in advance the first area information of each of the information receiving units and instructs the output of the electric waves only to the information receiving unit permitted in an area where the working vehicle is used, a configuration of the instructing unit can be simplified.

According to another aspect of the invention, a working vehicle includes the above communication system.

In the above aspect of the invention, the same advantages as those of the above communication system can be obtained.

According to still another aspect of the invention, a communication system provided to a hydraulic excavator includes: an information receiving unit that outputs electric waves to communicate with an IC tag in which identification information is stored and receives the identification information; a first area information storage that stores a first area information indicating an area where a use of the information receiving unit is permitted; a second area information storage that stores a second area information indicating an area where the hydraulic excavator is used; a comparing unit that compares the first area information with the second area information; and a communication control unit that permits the information receiving unit to output the electric waves when the comparing unit judges that the second area information is included in the first area information and prohibits the information receiving unit from outputting the electric waves when the comparing unit judges that the second area information is not included in the first area information.

In the above aspect of the invention, the same advantages as those of the above communication system can be obtained.

BRIEF DESCRIPTION OF DRAWING(S)

DESCRIPTION OF EMBODIMENT(S)

An exemplary embodiment of the invention will be described below with reference to attached drawings.

Description of Overall Hydraulic Excavator

Figure 1:
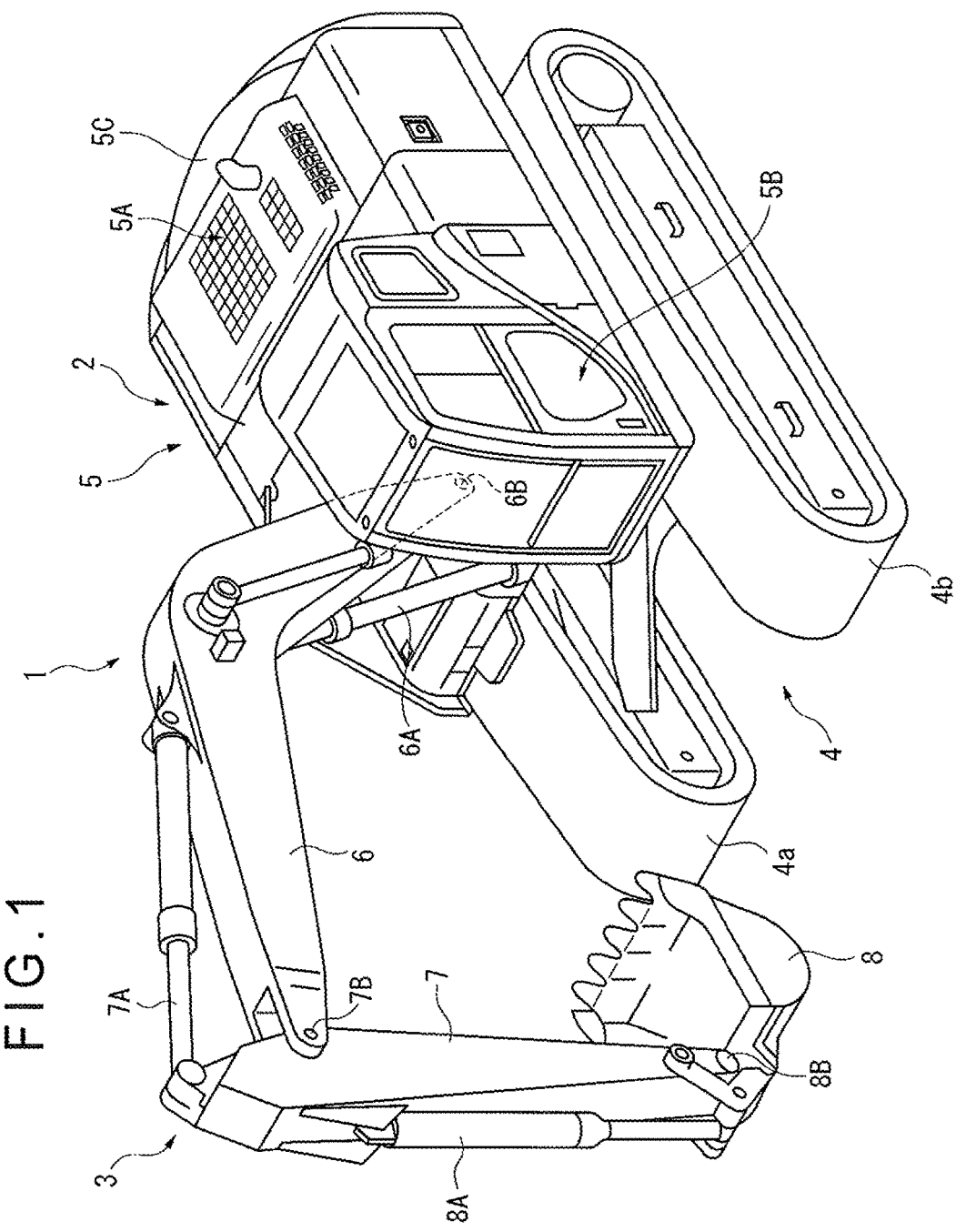
FIG. 1 is a perspective view showing a hydraulic excavator as an example of a working vehicle of the invention.

FIG. 1 is a perspective view showing a hydraulic excavator 1 as an example of a working vehicle in the exemplary embodiment.

In the exemplary embodiment, the hydraulic excavator 1 includes a vehicle body 2 and working equipment 3 as shown in FIG. 1. The vehicle body 2 includes an undercarriage 4 and an upper revolving body 5.

In the upper revolving body 5, a side where the working equipment 3 and a cab 5B are disposed is defined as a front and a side where a machine room 5A is disposed is defined as a back. A left side of the upper revolving body 5 facing the front is defined as a left and a right side of the upper revolving body 5 facing the front is defined as a right. In the hydraulic excavator 1 and the vehicle body 2, a side near the undercarriage 4 is defined as a bottom relative to the upper revolving body 5 while a side near the upper revolving body 5 is defined as a top relative to the undercarriage 4. When the hydraulic excavator 1 is disposed on a horizontal surface, the bottom is a side in a vertical direction, namely, a direction in which gravity acts, while the top is a side in a direction opposite the vertical direction.

In the exemplary embodiment, the hydraulic excavator 1 includes an internal combustion engine (e.g., a diesel engine) as a motive power generator. However, the motive power generator of the hydraulic excavator 1 is not limited to the internal combustion engine. For instance, the hydraulic excavator 1 may include the internal combustion engine, a generator motor and an electric storage device in combination (a so-called hybrid motive power generator). Alternatively, the hydraulic excavator 1 may include a motive power generator including a motor in place of the internal combustion engine.

Machine Room

Figure 2:
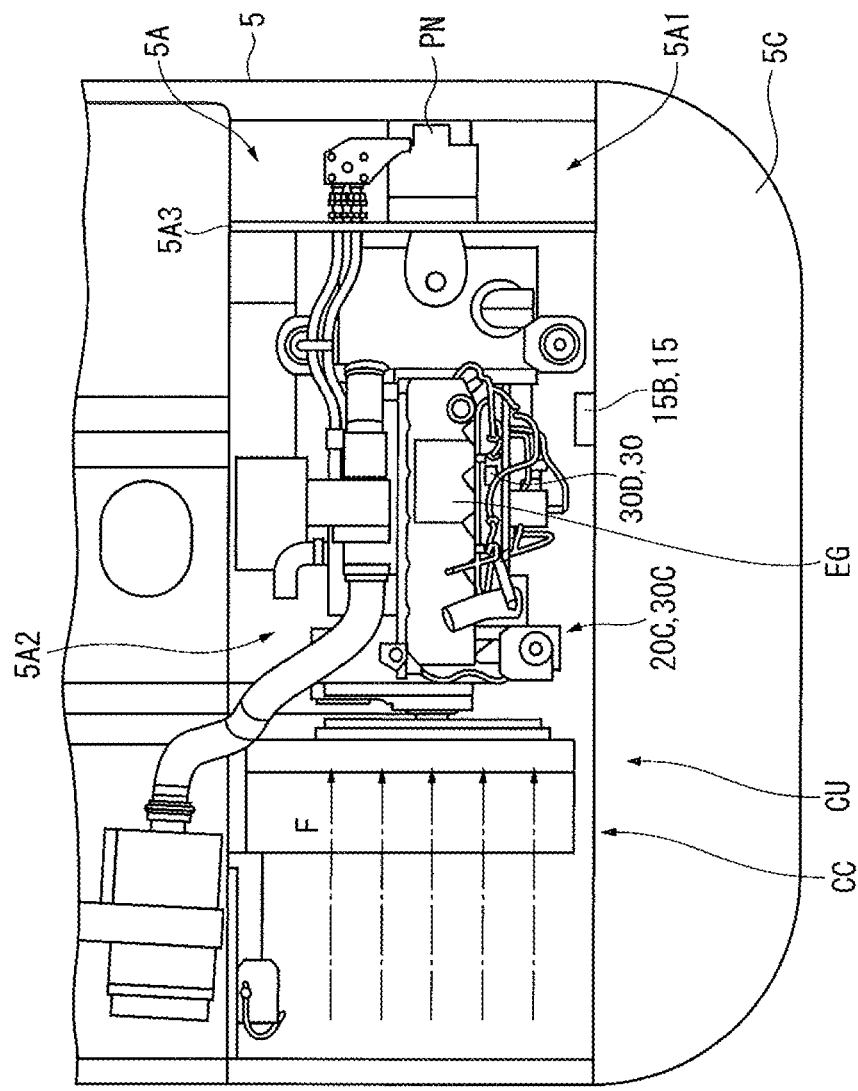
FIG. 2 is a schematic view showing an inside of a machine room.

FIG. 2 is a schematic view showing the machine room 5A.

The upper revolving body 5 includes the machine room 5A, the cab 5B, and a counterweight 5C.

The machine room 5A is disposed at a first end (back side) of the upper revolving body 5. An inside of the machine room 5A is divided by a partition 5A3 into a pump room 5A1 and an engine room 5A2 as shown in FIG. 2. The pump room 5A1 is positioned on the right of the machine room 5A and the engine room 5A2 is positioned on the left of the machine room 5A, seen from the back.

Engine Room

The engine room 5A2 contains an engine EG (motive power generator) and a cooling unit CU including a cooling core CC (e.g., radiator) and the like. The cooling unit CU is disposed adjacent to the engine EG and cools a cooling water flowing in the engine EG and a hydraulic fluid flowing in a hydraulic device (not shown).

The engine EG is disposed in a substantially sealed space defined by being surrounded by a partition in front of the counterweight 5C, a partition in front of the engine room 5A2, the partition 5A3 for separating the engine room 5A2 from the pump room 5A1 (right side), a door (not shown) on the left, a top plate including an engine hood disposed above the engine EG, and a bottom plate.

Further, in the engine room 5A2, a filter 20C (a fuel main filter), an identification device 30C, an identification device 30D attached to the engine EG, and a reader 15B that communicates with the identification devices 30C and 30D are provided. These components will be described in detail below.

The cab 5B is disposed at a second end (front side) of the upper revolving body 5 as shown in FIG. 1.

The counterweight 5C is provided on the farthest back side of the upper revolving body 5. The counterweight 5C is provided for weight balance with the working equipment 3 and is filled with weights. In other words, the machine room 5A is interposed between the cab 5B and the counterweight 5C.

The undercarriage 4 includes crawlers 4a and 4b. The undercarriage 4 is driven by a hydraulic motor (not shown) to rotate the crawlers 4a and 4b, whereby the hydraulic excavator 1 travels or is turned.

The working equipment 3 is attached to a lateral side of the cab 5B of the upper revolving body 5 and includes a boom 6, arm 7, bucket 8, boom cylinder 6A, arm cylinder 7A and bucket cylinder 8A. A base end of the boom 6 is jointed to a front of the vehicle body 2 through a boom pin 6B, whereby the boom 6 is movably attached. A base end of the arm 7 is jointed to a leading end of the boom 6 through an arm pin 7B, whereby the arm 7 is movably attached. The bucket 8 is jointed to a leading end of the arm 7 through a bucket pin 8B, whereby the bucket 8 is movably attached.

Description of Pump Room

Figure 3:
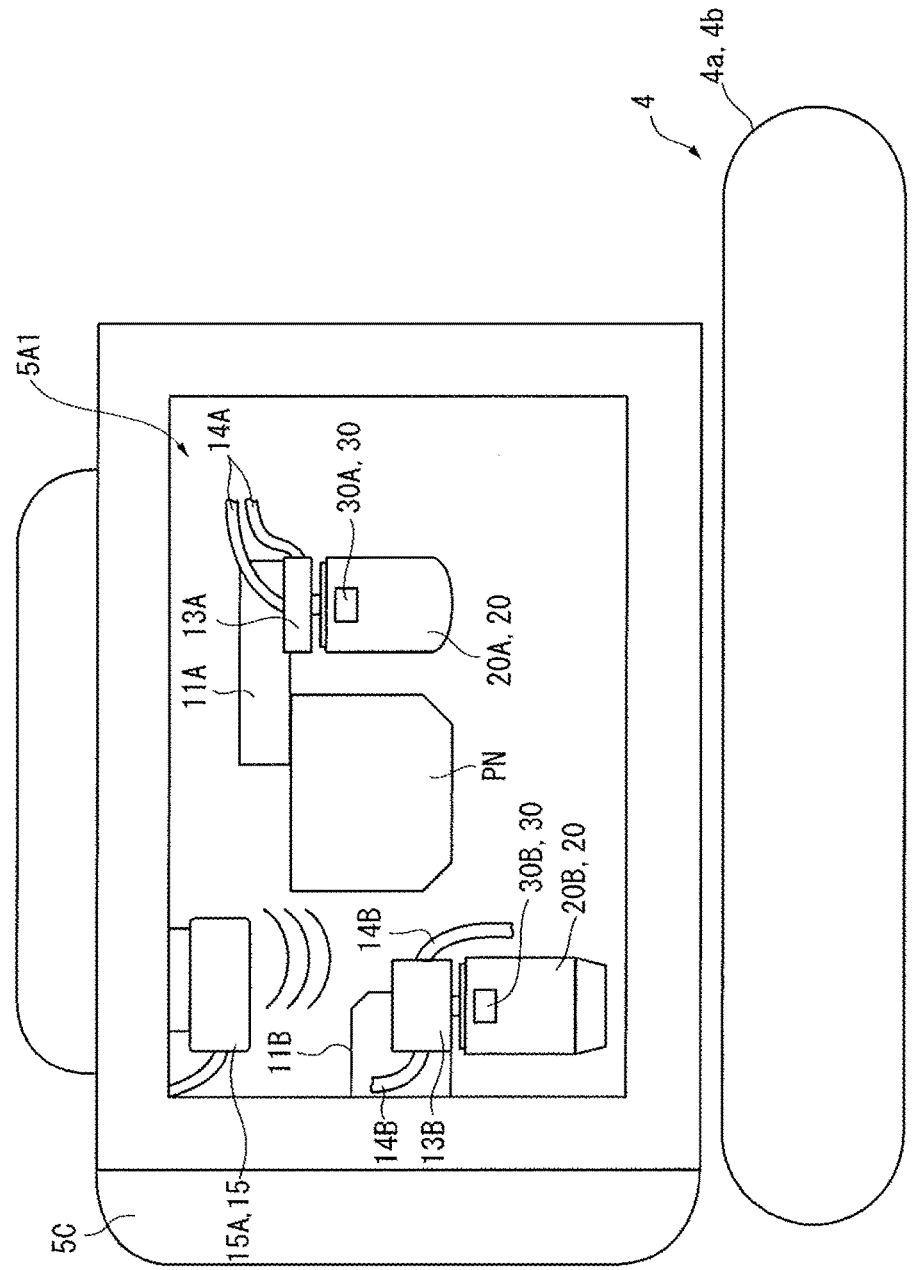
FIG. 3 is a schematic view showing an inside of a pump room.

FIG. 3 is an illustration showing an inside of the pump room 5A1 with a door (not shown) opened from the right side of the upper revolving body 5. In other words, FIG. 3 is a schematic view showing a layout of filters 20A and 20B and a reader 15A in the pump room 5A1. The pump room 5A1 is disposed in a substantially sealed space defined by being surrounded by a door (not shown) on the right, a partition in front of the counterweight 5C, a partition in front of the pump room 5A1, and the partition 5A3 for separating the pump room 5A1 from the engine room 5A2, the top plate including the engine hood disposed above the engine EG, and the bottom plate.

The hydraulic pump PN is housed in the pump room 5A1 as shown in FIG. 3. The hydraulic pump PN is mechanically connected to the engine EG and is driven by driving the engine EG. The hydraulic pump PN discharges hydraulic fluid to a hydraulic device such as the above boom cylinder 6A.

Specifically, a bracket 11A, on which the hydraulic pump PN is provided, is provided in the pump room 5A1. A filter head 13A (filter holding part) is attached to the bracket 11A. A hose 14A is attached to the filter head 13A.

A filter head 13B is attached to the pump room 5A1 through a bracket 11B. A fuel hose 14B is attached to the filter head 13B.

Filter Head in Pump Room and Types of Filter

A filter 20A is attached to the filter head 13A. The filter 20A is an oil filter for the engine oil and eliminates dirt and the like contained in the engine oil flowing in the hose 14A.

The filter 20A is connected to the engine EG (see FIG. 2) through the hose 14A. The engine oil accumulated in the engine EG is pumped out of the engine EG to be transferred to the filter 20A. The engine oil after passing through the filter 20A is returned to the engine EG.

A filter 20B is attached to the filter head 13B. The filter 20B is a fuel pre-filter and eliminates dirt and the like contained in the fuel flowing in the fuel hose 14B. Note that the filter 20B is not a requisite for the hydraulic excavator 1. The hydraulic excavator 1 without the filter 20B is also usable.

The filter 20B (fuel pre-filter) is connected to a fuel tank (not shown) through the hose 14B. The fuel in the fuel tank (not shown) is transferred to the filter 20B. Subsequently, the fuel is transferred to the filter 20C (fuel main filter). After passing through the filter 20C, the fuel is transferred to a fuel injector (not shown). The fuel remaining in the fuel injector is returned to the fuel tank through a hose (not shown).

As described above, the filters 20A and 20B are provided in the pump room 5A1 while the filter 20C is provided in the engine room 5A2.

The filters 20 (20A, 20B, 20C) are parts requiring a regular replacement since a filter member inside the filters is clogged by use of the filters 20. Timing for the regular replacement is judged, for instance, based on accumulated operational duration shown by SMR (service meter) that measures operational duration of the engine in the hydraulic excavator 1. Such a judgment process is conducted, for instance, by a communication controller 200, a monitor 213 or a management server 111 which will be described below.

Identification devices 30A, 30B and 30C are respectively attached to the filters 20A, 20B and 20C. The identification device 30D is attached to the engine EG as described above.

Description of Identification Device

The identification devices 30 (30A, 30B, 30C, 30D) store and provide information relating to the target components (including devices such as the engine EG in addition to the replacement parts) to which the identification devices 30 are attached.

A passive type IC tag 301 that generates electric power by electromagnetic induction, microwaves and the like caused by electric waves outputted from the readers 15 (15A, 15B) is usable as the identification devices 30A, 30B and 30C. In the exemplary embodiment, each of the identification devices 30A, 30B and 30C includes at least one of the IC tag 301 (identification part) (see FIG. 4). Accordingly, each of the identification devices 30A, 30B and 30C may include a single IC tag 301 or a plurality of IC tags 301.

The identification device 30D includes a single passive-type IC tag 301 described above. The IC tag 301 of the identification device 30D may be the same as or different from the IC tags 301 of the respective identification devices 30A, 30B and 30C in shape and configuration. The IC tag 301 of the identification device 30D at least includes an antenna 36 and an IC chip 35 which will be described below.

Since each of the identification devices 30 thus includes the passive type IC tags 301, an internal battery is unnecessary, so that a cost is reducible and operation failure caused by a run-out battery is preventable.

Description of IC Tag

Figure 4:
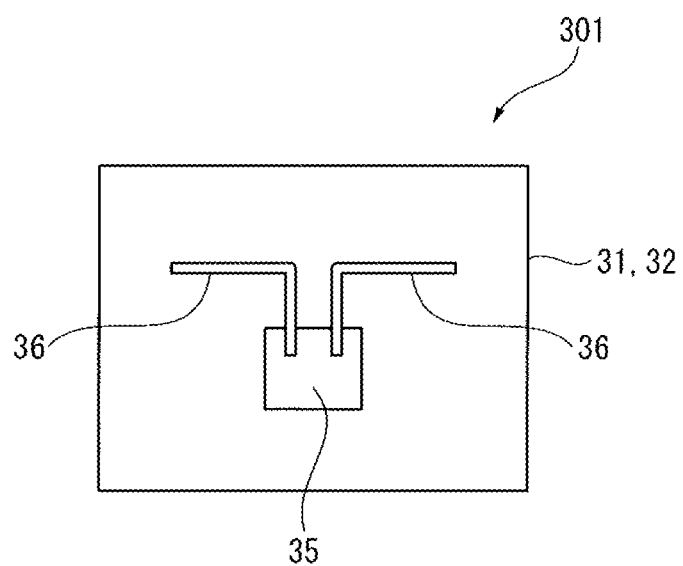
FIG. 4 is a schematic view showing a configuration of an IC tag.

FIG. 4 is a schematic view showing a configuration of the IC tag 301. The IC tag 301 is an RFID (Radio Frequency Identification) tag in which the IC chip 35 and the internal antenna 36 are encapsulated with package materials 31 and 32.

The IC tag 301 of the exemplary embodiment can communicate in a communication frequency zone, namely, a UHF (ultrahigh frequency) zone, specifically, in a zone of 860 MHz to 960 MHz. The communication frequency zone of the RFID tag may be a zone other than the above zone.

The IC chip 35 is connected to the antenna 36. A shape and a size of the antenna 36 are set so that the antenna 36 can communicate with the readers 15A and 15B. The IC chip 35 and the antenna 36 are held between the package materials 31 and 32. FIG. 4 is an illustration with the package material 31 being seen through. The IC tag 301 is attached to each of the filters 20A, 20B and 20C and the engine EG with a bonding member such as a double-sided adhesive tape or an adhesive agent.

The IC chip 35 stores parts information (tag information) including a code for identifying an IC chip 35 (TID: Tag Identifier) and a code for identifying a part (e.g., filter 20 and engine EG) to which each of the identification devices 30 is attached (EPC: Electronic Product Code).

Among the above codes, EPC stores identification information including a part name identification number for identifying a name of a part, a part number for specifying a type of the part to which each of the identification devices 30 is attached, a manufacturing date, a serial number (manufacturing number) for specifying each of parts having the same part number, and a supplier code showing a manufacturer of the part. The part name identification number is used for identifying the parts such as the engine oil filter, fuel pre-filter and fuel main filter. For instance, an individual number is allocated to each of the parts as the part name identification number. When the part is the engine EG, an individual number allocated to the engine may be defined as the part name identification number. Moreover, when the part is the engine EG, the identification information includes, for instance, the number of times of overhaul of the engine EG. For instance, the part name identification number is used for judgment by a later-described information identification judging unit 207.

Description of Parts Information Management System

Figure 5:
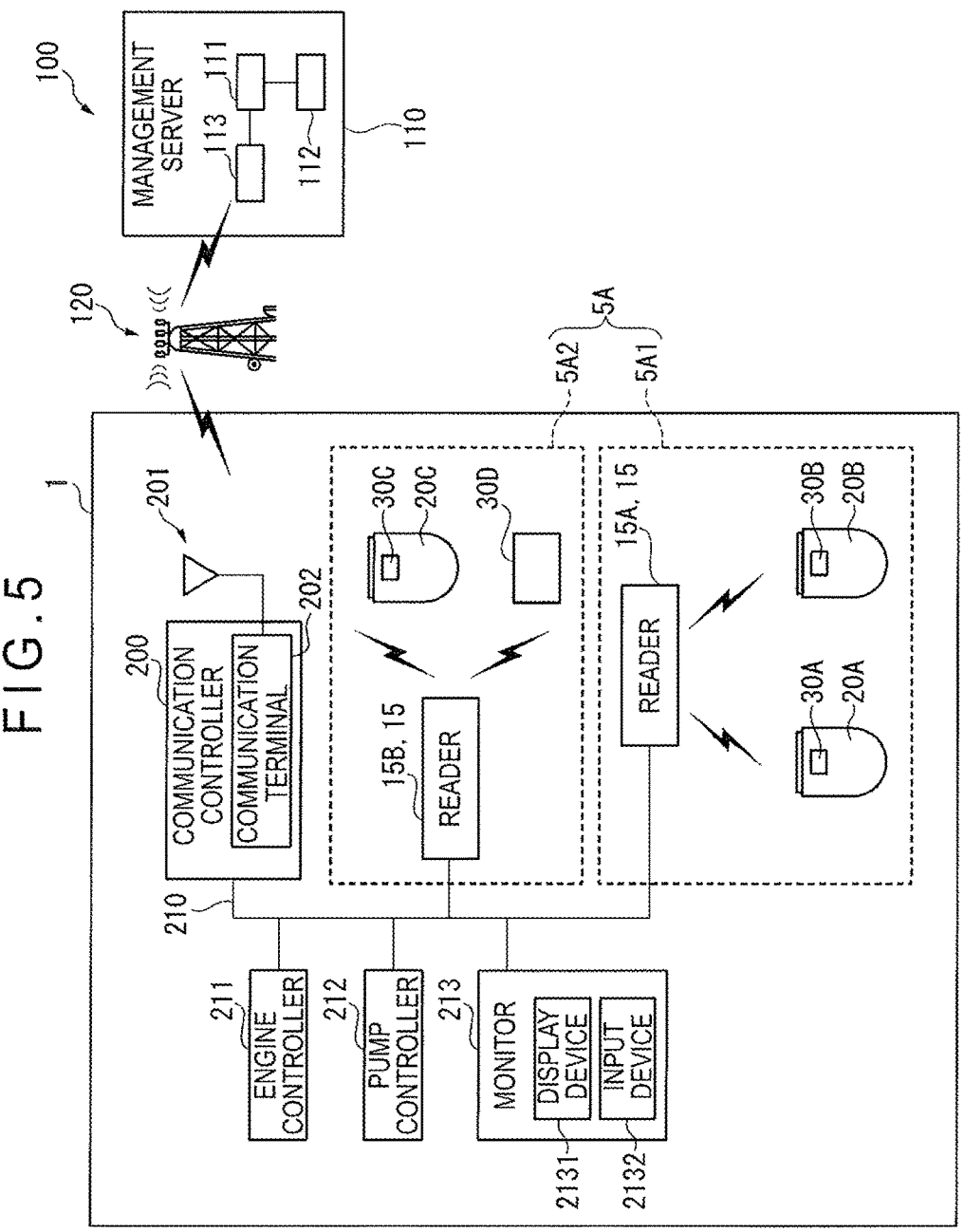
FIG. 5 is a block diagram showing a configuration of the hydraulic excavator and an overall configuration of a parts information management system.

FIG. 5 is a block diagram showing a configuration of the hydraulic excavator 1 and an overall configuration of a parts information management system 100 including the hydraulic excavator 1.

The readers 15 (15A, 15B), which are communication devices to communicate with the identification devices 30A, 30B, 30C and 30D, are attached to the machine room 5A as shown in FIG. 5. The readers 15 read out parts information including the parts information (hereinafter, also simply referred to as "data") stored in the respective IC tags 301 of the identification devices 30A, 30B, 30C and 30D. In the exemplary embodiment, the readers 15 each have a reading function. However, the readers 15 each may be replaced by a reader-writer having a writing function in addition to the reading function.

The reader 15A corresponds to a first communication device in the exemplary embodiment and is provided to the pump room 5A1. The reader 15A communicates with the identification devices 30A and 30B respectively attached to the filters 20A and 20B and supposed to be positioned within a communication range of the reader 15A, under the control by the communication controller 200. The reader 15A reads out the parts information from the identification devices 30A and 30B assuming that the parts information is readable. Further, the reader 15A controls an operation of the reader 15B. In other words, the reader 15A corresponds to the first communication device in the exemplary embodiment and serves as the master reader. The reader 15B corresponds to a second communication device in the exemplary embodiment and serves as the slave reader controllable by the master reader.

The reader 15B, which is disposed in the engine room 5A2, reads the parts information from the identification device 30C attached to the filter 20C and the identification device 30D attached to the engine EG, assuming that the parts information are readable from the identification devices 30C and 30D. Note that the communication range of the reader 15A indicates a range in which electric waves outputted from the reader 15A can reach the identification devices 30 and the reader 15A can receive response signals outputted from the identification devices 30 in response to the outputted electric waves. The same description is applied to a communication range of the reader 15B.

Although the operation of the reader 15B is controlled through the master reader 15A, the operation of the reader 15B may be directly controlled by the communication controller 200.

Figure 6:
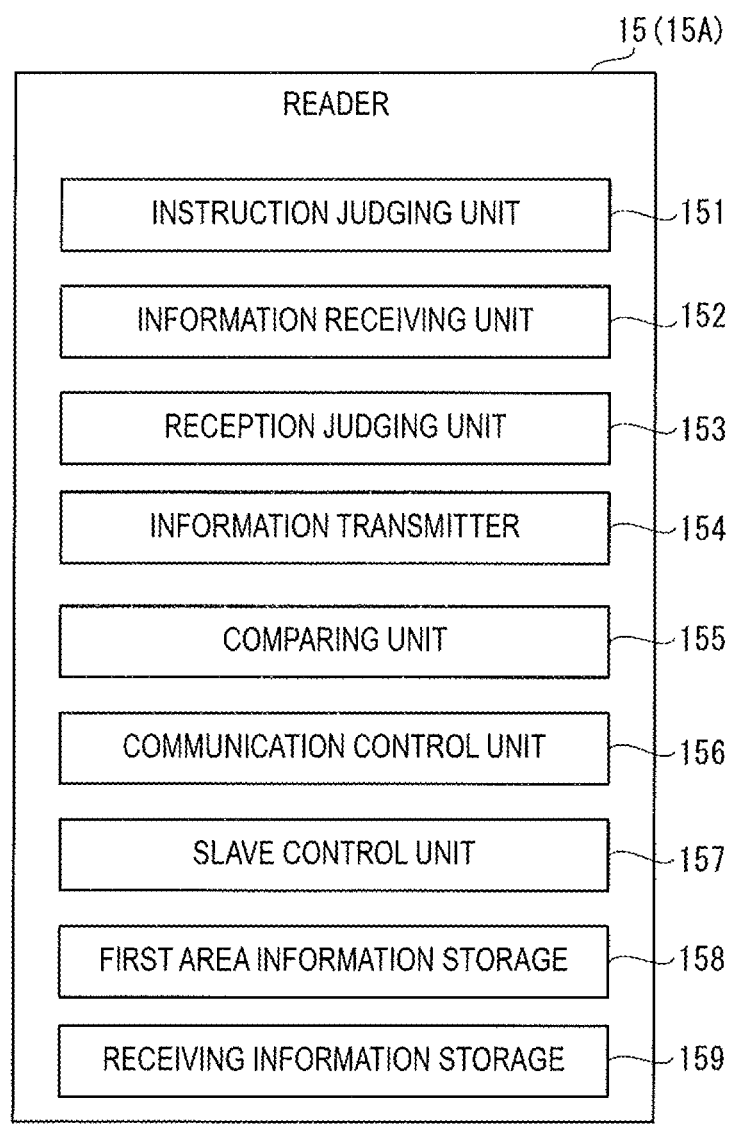
FIG. 6 is a block diagram showing a configuration of a reader (master).

FIG. 6 is a block diagram showing a configuration of the reader 15A.

As shown in FIG. 6, the reader 15A includes an instruction judging unit 151, an information receiving unit 152, a reception judging unit 153, an information transmitter 154, a comparing unit 155, a communication control unit 156, a slave control unit 157, a first area information storage 158, and a receiving information storage 159.

The instruction judging unit 151 judges whether or not instruction information of acquiring the parts information stored in the identification devices 30 is inputted from the communication controller 200 described below.

When the instruction judging unit 151 judges that the instruction information is inputted, the information receiving unit 152 outputs the electric waves to the identification devices 30 for a predetermined time and receives the parts information from the identification devices 30. Accordingly, the information receiving unit 152 forms the information receiving unit according to the exemplary embodiment that outputs electric waves to communicate with the identification device 30 in which the identification information is stored.

The reception judging unit 153 judges whether or not the electric waves including the parts information held in the identification devices 30 are received from the identification devices 30 based on the electric waves outputted by the information receiving unit 152.

The information transmitter 154 transmits the parts information received by the information receiving unit 152 to the communication controller 200. Moreover, as described later, when the parts information is not acquired from the identification device 30, the information transmitter 154 transmits error information to the communication controller 200.

The comparing unit 155 judges by comparing a second area information to be transmitted from the communication controller 200 as described later with a first area information stored in the first area information storage 158.

Based on the judgment result by the comparing unit 155, the communication control unit 156 controls the output of the electric waves by operating the information receiving unit 152 to permit the output of the electric waves or by prohibiting the operation of the information receiving unit 152 to prohibit the output of the electric waves.

The slave control unit 157 controls the operation of the reader 15B serving as the slave reader. For instance, the slave control unit 157 outputs the same instruction information as the above instruction information and the second area information to the reader 15B. Moreover, the reception judging unit 153 judges whether or not the reader 15B is normally operated by judging whether or not the reception judging unit 153 receives the parts information from the reader 15B within a predetermined time elapsed after the instruction information is outputted from the slave control unit 157. Accordingly, the slave control unit 157 forms a second communication device control unit.

The first area information storage 158 is formed by a rewritable storage (e.g., flash memory) capable of maintaining contents even when electric power is turned off. The first area information storage 158 stores the first area information indicating a permitted use of the reader 15 (15A, 15B).

The receiving information storage 159 stores the parts information received by the information receiving unit 152 from the identification device 30 and the error information.

Moreover, the receiving information storage 159 of the reader 15A also stores the parts information and the error information transmitted from the reader 15B.

Figure 7:
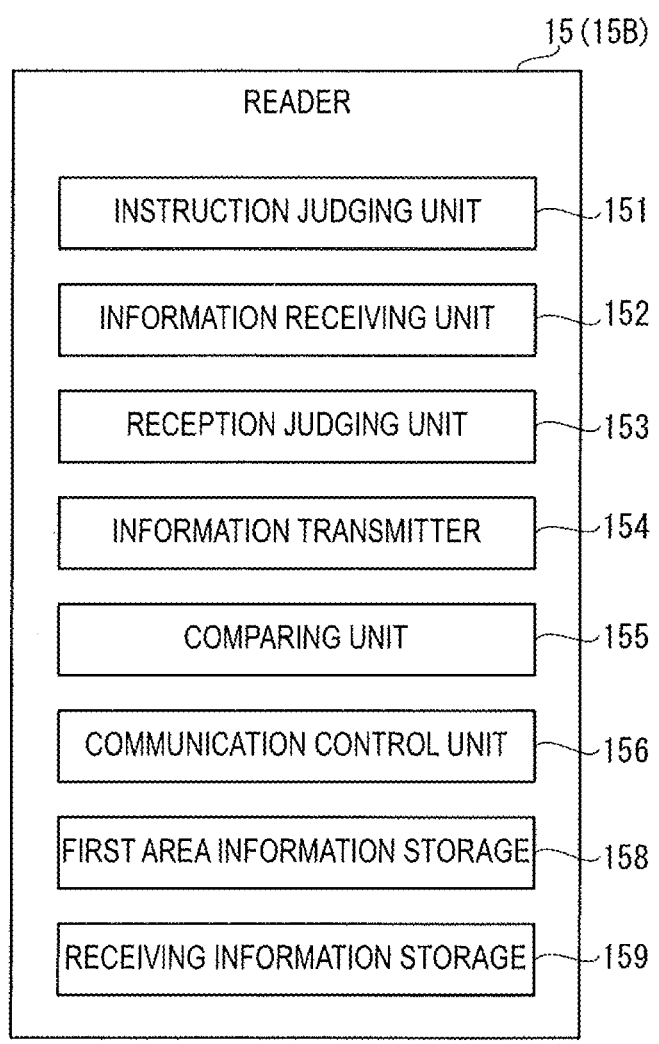
FIG. 7 is a block diagram showing a configuration of a reader (slave).

FIG. 7 is a block diagram showing a configuration of the reader 15B.

As shown in FIG. 7, the reader 15B includes the instruction judging unit 151, the information receiving unit 152, the reception judging unit 153, the information transmitter 154, the comparing unit 155, communication control unit 156, the first area information storage 158 and the receiving information storage 159.

In other words, the master reader 15A includes the slave control unit 157 while the slave reader 15B includes no slave controller.

The instruction judging unit 151 of the reader 15B judges whether or not instruction information of acquiring the parts information stored in the identification device 30 is inputted from the reader 15A.

When the instruction judging unit 151 of the reader 15B judges that instruction information is inputted, the information receiving unit 152 of the reader 15B outputs electric waves to the identification device 30 and receives the parts information from the identification device 30. Accordingly, the information receiving unit 152 of the reader 15B also forms the information receiving unit according to the exemplary embodiment that outputs electric waves to communicate with the identification device 30 in which the identification information is stored.

The reception judging unit 153 of the reader 15B judges whether or not the electric waves including the parts information held in the identification device 30 are received from the identification device 30 based on the electric waves outputted from the information receiving unit 152.

The information transmitter 154 of the reader 15B transmits the parts information received by the information receiving unit 152 to the reader 15A. Moreover, when the parts information is not acquired from the identification device 30, the information transmitter 154 of the reader 15B transmits error information to the reader 15A.

The comparing unit 155 of the reader 15B judges by comparing the second area information transmitted from the communication controller 200 with the first area information stored in the first area information storage 158, as described later.

Based on the judgment result by the comparing unit 155, the communication control unit 156 of the reader 15B controls whether to operate the information receiving unit 152 to output electric waves or to prohibit the operation of the information receiving unit 152 to prohibit the output of the electric waves.

The first area information storage 158 of the reader 15B is formed by a rewritable storage (e.g., flash memory) capable of maintaining contents even when electric power is turned off and stores the first area information that indicates an area where the use of the reader 15 (15A, 15B) is permitted.

The receiving information storage 159 of the reader 15B stores the parts information received by the information receiving unit 152 from the identification device 30 and the error information.

When the communication controller 200 directly controls the reader 15B, the reader 15B may output the electric waves based on the instruction information from the communication controller 200 to directly transmit the parts information received from the identification device 30 to the communication controller 200, in the same manner as the reader 15A does.

First Area Information

Since the reader 15 outputs the electric waves, it is necessary to set an output, a frequency and the like of the electric waves based on the regulations of Radio Law of each country. Moreover, in some countries, the reader 15 needs to be authorized in advance for use. Accordingly, an area in which the reader 15 can be used is limited in advance. In order to specify the area in which the reader 15 is usable, the first area information is stored in the first area information storage 158.

Note that the area in which the use of the reader 15 is permitted is not necessarily limited to be defined in terms of countries. For instance, when common regulations are employed in a plurality of countries as European Union, the use of the reader 15 is permitted in areas including the plurality of countries. When each area in one country has different regulations, the use of the reader 15 is permitted in each area. In other words, it can also be said that the first area information expresses the kind of the regulations permitting the use of the reader 15.

Electric Wave Communication Code

Accordingly, in the exemplary embodiment, an electric wave communication code is used as the first area information. Specifically, Communications Standard defined in LLRP (Low Level Reader Protocol) stipulated by EPC global (non-profitable organization) is used as the first area information.

The first area information is an unsigned short-precision integer and is a numeral set for each of the regulations of each of the countries. For instance, "1" represents "US FCC Part 15", "6" represents "Japan: ARM STD T89" and "17" represents "Japan 952-954 MHz 4W LBT."

The first area information storage 158 of the reader 15 stores a numeral of Communications Standard in accordance with which the reader 15 is authorized. When the reader 15 receives a plurality of authorization, a plurality of numerals (first area information) are stored in the first area information storage 158.

The first area information is written in the first area information storage 158 as firmware data of the reader 15 at factory shipment of the hydraulic excavator 1 installed with the reader 15.

The reader 15 (15A, 15B) communicates with the IC tag 301 of the identification device 30, for instance, via electric waves in the UHF zone at 900 MHz. Since the reader 15 (15A, 15B) can communicate with the identification devices 30A, 30B, 30C and 30D that are about 1 m away from the reader 15 (15A, 15B) when the electric waves fall within the above frequency zone, the reader 15 (15A, 15B) can be used even in the pump room 5A1 and the engine room 5A2.

In the exemplary embodiment, the readers 15 in a form of a reading device are used as communication devices. However, the reader 15 may be replaced by a reader-writer (reading and writing device) having a reading function of information from the identification device 30 and a writing function of information to the identification device 30.

Although two readers 15 (15A, 15B) are provided in the exemplary embodiment, only the reader 15A may be provided. Alternatively, the readers 15 may be provided by three or more readers including the readers 15A and 15B. Since a communication condition between the reader 15 and each of the identification device 30 depends on a relative positional relationship therebetween, with a plurality of readers 15, the parts information stored in the IC tag can be read with higher probability.

When two or more of the readers 15 are provided, one of the readers 15 may be the master reader 15A and the other of the readers 15 may be the slave reader 15B.

Description of Each Controller

As shown in FIG. 5, in addition to the above configuration, the hydraulic excavator 1 (working vehicle) further includes the communication controller 200, an engine controller 211, a pump controller 212 and a monitor 213 and an in-vehicle network 210 that connects the communication controller 200, the engine controller 211, the pump controller 212 and the monitor 213 to allow data communication therebetween.

Engine Controller

The engine controller 211 receives power supply from a battery (not shown) by a key-on operation of an operator and is driven. When the engine EG is started, the engine controller 211 notifies the communication controller 200 of information indicating the start of the engine.

The engine controller 211 adjusts a fuel amount to be supplied to the engine EG to control output of the engine EG.

Description of Pump Controller

The pump controller 212 controls output of the hydraulic pump PN.

Monitor

The monitor 213 includes: a display device 2131 that displays a remaining amount of the fuel, failure information of the hydraulic excavator 1, and the like; and an input device 2132 that sets the operation of the hydraulic excavator 1. The display device 2131 is formed by a liquid crystal display and the like. The input device 2132 is formed by a switch button and the like. Alternatively, the display device 2131 and the input device 2132 may be integrated in a form of a touch panel. The monitor 213 includes an SMR (service meter) that measures an operational duration of the engine EG of the hydraulic excavator 1, the SMR being displayed on the display device 2131. Information of the SMR (information of accumulated operational duration) is transmitted to the management center 110 through the communication controller 200 and the communication network 120.

Communication Controller

The communication controller 200 has a communication terminal 202 connected to an antenna 201 in order to allow intercommunication with the management center 110 via a later-described communication network 120.

The communication controller 200 is connected to the engine controller 211, the pump controller 212, the monitor 213 and the readers 15A, 15B via the in-vehicle network 210, so that the communication controller 200, the engine controller 211, the pump controller 212, the monitor 213 and the readers 15A, 15B can communicate data to each other.

Further, the communication controller 200 serves as an instruction device that instructs the readers 15A and 15B to acquire the pans information (identification information) as described later. The communication system of the exemplary embodiment is formed by the communication controller 200, the readers 15A and 15B, and the identification device 30 which can communicate data to each other via the in-vehicle network 210. It should be noted that the communication system may be provided to the working vehicle as described above, or alternatively, the communication system may include such a vehicle and at least the management server 111 of the management center 110.

Figure 8:
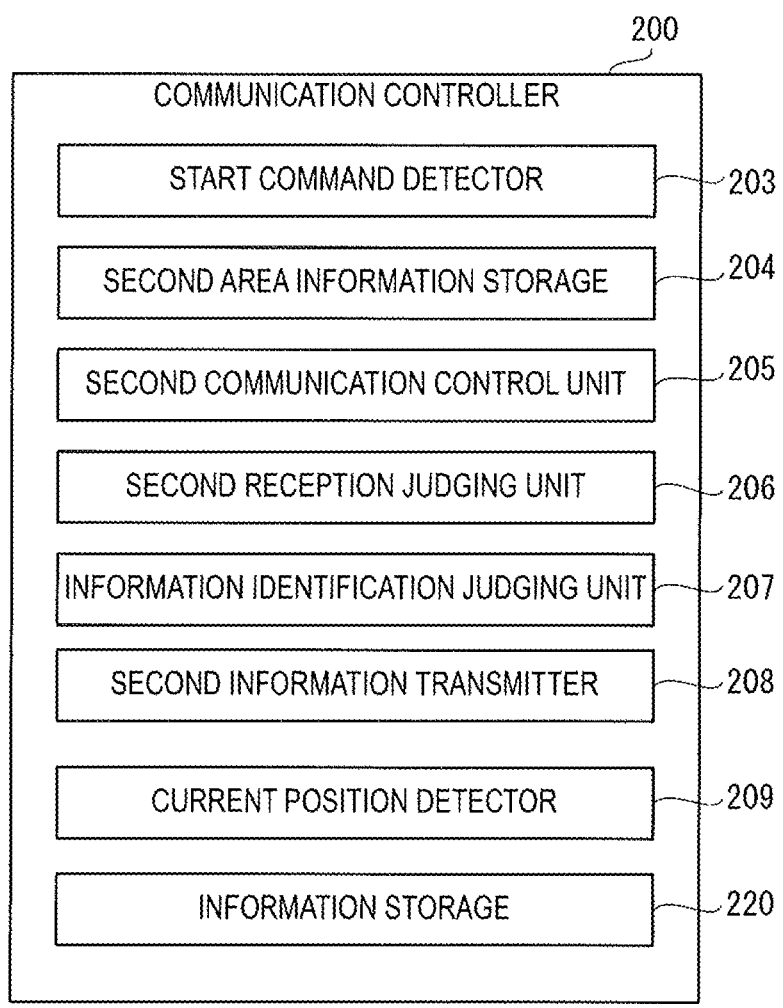
FIG. 8 is a block diagram showing a configuration of a communication controller.

As shown in FIG. 8, the communication controller 200 includes a start command detector 203, second area information storage 204, second communication control unit 205, second reception judging unit 206, information identification judging unit 207, second information transmitter 208, current position detector 209, and information storage 220. The information storage 220 stores the parts information previously received from the reader 15.

For instance, the start command detector 203 detects the start of the engine EG based on the signal from the engine controller 211 or a drive command received from the management center 110.

The second communication control unit 205 controls the output (excitation) of electric waves of the reader 15 based on a detection result of the start command detector 203.

The second reception judging unit 206 judges whether or not the information is received from the reader 15.

The information identification judging unit 207 compares the parts information received from the reader 15 with the parts information stored in the information storage 220 and judges whether both of the parts information (data) are the same or different. When the information identification judging unit 207 judges that new parts information (data) is acquired, the information storage 220 holds the stored parts information (data) and stores the acquired parts information (data). In this case, subsequently, when the parts information held by the information storage 220 is not contained in the parts information received from the reader 15, the stored parts information may be deleted at this timing. Alternatively, when the information identification judging unit 207 judges that new parts information is acquired, the parts information stored in the information storage 220 may be deleted immediately. In both cases, the parts information about the replaced and removed part is deleted from the information storage 220 and the parts information about the newly attached part is stored in the information storage 220. The information identification judging unit 207 can judge, for instance, by comparing the acquired and stored part name identification number with the newly acquired part name identification number. Such a comparison process may be conducted in the management server 111 described later.

The second information transmitter 208 transmits the information acquired by the reader 15 from the identification device 30, a result of a receiving process (error information) and the like to the management server 111. At this time, the second information transmitter 208 transmits the data read from the identification device 30 together with one or more of data such as data indicating a time when the reader 15 is operated, data indicating a time when the reader 15 reads the data of the identification device 30, and data indicating a time when transmitting the data of the identification device 30 to the management server 111, to the management server 111 of the management center 110 via the communication terminal 202, the antenna 201 and the communication network 120. The data indicating the time can be acquired, for instance, by a timepiece IC of the communication controller 200.

Note that a controller (e.g., the pump controller 212) other than the communication controller 200 or the readers 15 may have the above-described functions of the communication controller 200.

The current position detector 209 detects a current position of the hydraulic excavator 1. The current position detector 209 detects the current position of the hydraulic excavator 1, for instance, by receiving a satellite signal transmitted from a GPS (Global Positioning System) satellite.

Moreover, when the communication terminal 202 communicates with the management server 111 using a mobile phone network and a satellite communication network, the management server 111 can detect an area where the hydraulic excavator 1 is used by recognizing a wireless communication base station in wireless communication with the communication terminal 202. In this case, the current position detector 209 detects the current position of the hydraulic excavator 1 by receiving current position information of the hydraulic excavator 1 from the management server 111.

Second Area Information Storage

The second area information storage 204 stores the second area information indicating the area where the hydraulic excavator 1 (reader 15) is used.

The second area information is Communications Standard defined in LLRP in the same manner as the first area information. It is only necessary to store the second area information in the second area information storage 204, for instance, when the hydraulic excavator 1 is shipped from a factory or when the hydraulic excavator 1 is prepared for delivery after reaching a destination of the shipment.

For instance, a maintenance engineer of the hydraulic excavator 1 operates the input device 2132 provided to the monitor 213 to perform a service mode for maintenance, and operates a setting menu of the second area information in the service mode. At this time, the maintenance engineer may open the setting menu and directly input a numeral indicating Communications Standard of the area (country) where the hydraulic excavator 1 is used. Alternatively, the maintenance engineer may selectively input a regulation name of Communications Standard listed on the setting menu.

Further, the maintenance engineer may selectively input the area (e.g., country) where the hydraulic excavator 1 is used among the areas listed on the setting menu. At this time, when a plurality of standards are present in a single area, a correspondence table data that specifies a single to-be-used standard to each area may be stored in advance in the second area information storage 204. When an area is selected, a numeral of a standard corresponding to the area is automatically stored with reference to the correspondence table data. The correspondence table data may be provided in the management server 111. A selected area may be transmitted to the management server 111 via the communication terminal 202. The management server 111 may return a numeral of a standard to the communication terminal 202 and the numeral may be stored in the second area information storage 204.

At this time, the area where the hydraulic excavator 1 is used is not necessarily inputted using the input device 2132 of the monitor 213. Alternatively, the current position of the hydraulic excavator 1, which is detected by the current position detector 209, may be inputted and set as the second area information and stored in the second area information storage 204. When the area where the hydraulic excavator 1 is used is changed, for instance, as the hydraulic excavator 1 travels or is moved by a trailer on which the hydraulic excavator 1 is mounted, the current position detector 209 detects a current position of the moved hydraulic excavator 1. The second area information stored in the second area information storage 204 is updated with the detected current position as the second area information. By this process, the area where the hydraulic excavator 1 moved by the trailer and the like is located is stored in the second area information storage 204 as the second area information.

Parts Information Management System of Working Vehicle

Next, the parts information management system 100 with use of the information of the identification devices 30 will be described. The parts information management system 100 is exemplarily applied to the hydraulic excavator 1 below. However, the invention is also applicable to other working vehicles in a form of a construction machine.

The parts information management system 100 manages and monitors presence or absence of parts replacement of a filter and the like provided to the working vehicle in the management center 110 located apart from the working vehicle, via the communication network 120. As shown in FIG. 5, the parts information management system 100 includes the management center 110, at least one working vehicle (e.g., the hydraulic excavator 1), and the communication network 120 that transmits and receives information between the management center 110 and the working vehicle.

Among these, the communication network 120 is used for data communication in a form of wireless communication. A mobile phone network and a satellite communication network are usable.

The management center 110 includes the management server 111 that manages all various information including parts information of a plurality of working vehicles.

The management server 111 includes a large-volume storage including hard disks and the like. The management server 111 can mutually communicate with a display 112 including a liquid crystal monitor and the like, a communication device 113 capable of wireless communication or wired communication, and the like. The management server 111 manages and stores the above parts information received from the hydraulic excavator 1, the information about the accumulated operational duration, and the like via the communication network 120.

Specifically, the management server 111 in a form of the above storage stores TID and EPC contained in the parts information in manner associated with each other. Accordingly, by cross-checking the newly acquired parts information (data), which is a combination of TID and EPC read from the IC tag 301, and the stored parts information (data), the management server 111 can judge whether or not the part (e.g., filter 20) of the working vehicle is replaced and whether or not the replaced part is a genuine product. By such a cross-checking, a time elapsed after the part is attached to the working vehicle can be grasped. Accordingly, for instance, the management server 111 can manage a replacement timing of the filter 20.

Information Collection Process in Parts Information Management System

Figure 9:
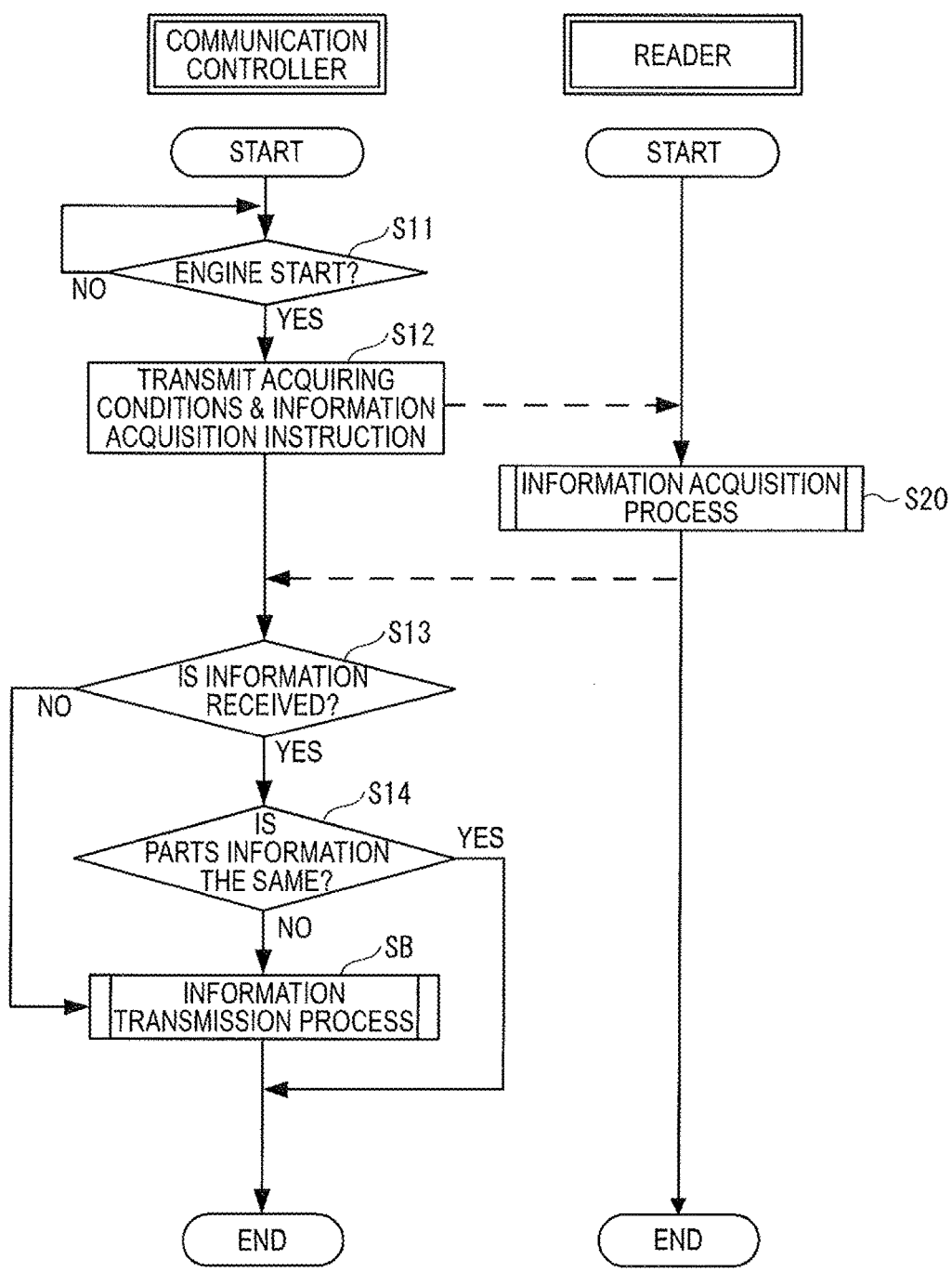
FIG. 9 is a flow chart showing an information collection process of the communication controller.

FIG. 9 is a flowchart showing an information collection process executed in the parts information management system 100.

FIG. 9 illustrates an information collection process when a start command is given. The start command is given when the operator of the hydraulic excavator 1 starts the engine EG by a key-on operation or when a start command (start signal) is given from an administrator of the management center 110 to the communication controller 200 to start the communication controller 200 and the reader 15. The parts information management system 100 in the exemplary embodiment generates the start signal at one or both of when the start command is given to operate the reader 15 in response to the start signal (trigger signal), whereby the information collection process is performed.

Alternatively, the information collection process may be performed at a timing other than when the start command is given. The information collection process performed at the timing other than when the start command is given means that the reader 15 is operated on a regular basis (e.g., at a predetermined time in a day) or according to an operational instruction from the operator or the administrator of the management center 110.

For instance, a timer function may be provided to the communication controller 200. The communication controller 200 may be set to operate the reader 15 at a regular timing (e.g., once per day at a predetermined time) in response to the start signal (trigger signal). Alternatively, the communication controller 200 may activate the reader 15 according to an operational instruction by the operator using the input device 2132 (a predetermined operational button) of the monitor 213. Specifically, when the operator operates the operational button for generating a predetermined start signal, the communication controller 200 may activate the readers 15 in response to the start signal (trigger signal) on receiving the start signal.

In addition, a sensor may be provided to each of the filter heads 13A, 13B and 13C to detect attachment and detachment of the respective filters 20A, 20B and 20C, so that the reader 15 may be activated in response to the output (start signal) as a trigger from the sensor.

Information Collection Process when Start Command is Given

Next, the information collection process when the start command is given will be described with reference to FIG. 9.

Information Acquisition Instruction Control by Communication Controller

The start command detector 203 of the communication controller 200 checks presence or absence of information representing the engine start (engine start information) from the engine controller 211 and judges whether or not the engine is started or the communication controller 200 is activated based on the ON-operation of the key switch of the engine by the operator or the start command sent from the management center 110 via the communication network 120 (Step S11). FIG. 9 illustrates detection of the engine start information by the start command detector 203. Note that the engine start information may be generated using a signal indicating the operation of the key switch to an accessory position. In other words, even when the engine is not started by the key switch, the key switch is operated to the accessory position and an electronic device (e.g., the communication controller 200 and the reader 15) and the like are powered on (Step S11, Yes), the information collection process when the start command is given as shown in FIG. 9 may be performed.

When the start command detector 203 does not detect the engine start information, the start command detector 203 judges No in Step S11 and repeats the checking of Step S11.

When the start command detector 203 detects the start of the engine EG and judges Yes in Step S11, the second communication control unit 205 of the communication controller 200 transmits (outputs) acquiring conditions (reading conditions) for acquiring the parts information from the identification device 30 and an instruction to acquire the parts information from the identification device 30 (Step S12).

Acquiring Conditions (Reading Conditions)

The acquiring conditions (reading conditions) at least include the second area information (electric wave communication code) stored in the second area information storage 204, the number of the set reader 15 and a reading time.

Setting of Number of Reader

Data of setting the number of the reader 15 means data of the number of the reader 15 that is provided in the hydraulic excavator 1 in use. In the exemplary embodiment, since two readers 15A and 15B are used, the number of the reader is set at "2. Setting of the number of the reader 15A is used for notifying the master reader 15A of the number of the slave reader(s) to be controlled by the reader 15A. In other words, when the number of the reader is set at "2," one slave reader is present in addition to the master reader. When the number of the reader is set at "3," two slave readers are present in addition to the master reader. When the number of the reader is set at "1," no slave reader is present in addition to the master reader. Thus, the master reader 15A can recognize how many slave reader(s) should be controlled using the slave control unit 157.

Specifying Reading Time

A time until the reader 15 acquires the identification information (tag information) from the identification device 30 is specified as the reading time. When a plurality of readers 15 are present, a time until all the readers 15 read the tag information of the identification device 30 is specified as the reading time. For instance, the reading time is set at 30 seconds for each reader. When two readers 15 are provided, the reading time is set at 60 seconds. In other words, the reading time for each reader can be calculated by the specified reading time divided by the number of the reader.

Specifically, the second communication control unit 205 transmits the above acquiring conditions (the electric wave communication code as the second area information, the number of the set readers and the reading time) and outputs to the reader 15 an information acquisition instruction (instruction command) to instruct the reader 15 to start acquiring information. For instance, the second communication control unit 205 transmits set values of the electric wave communication code being 17, the number of the readers being 2 and the reading time being 60 seconds as the acquiring conditions.

When the instruction information of acquiring the parts information is outputted from the second communication control unit 205, the reader 15 performs an information acquisition process S20 for acquiring the information of the identification device 30.

Information Acquisition Process of Reader

Figure 10:
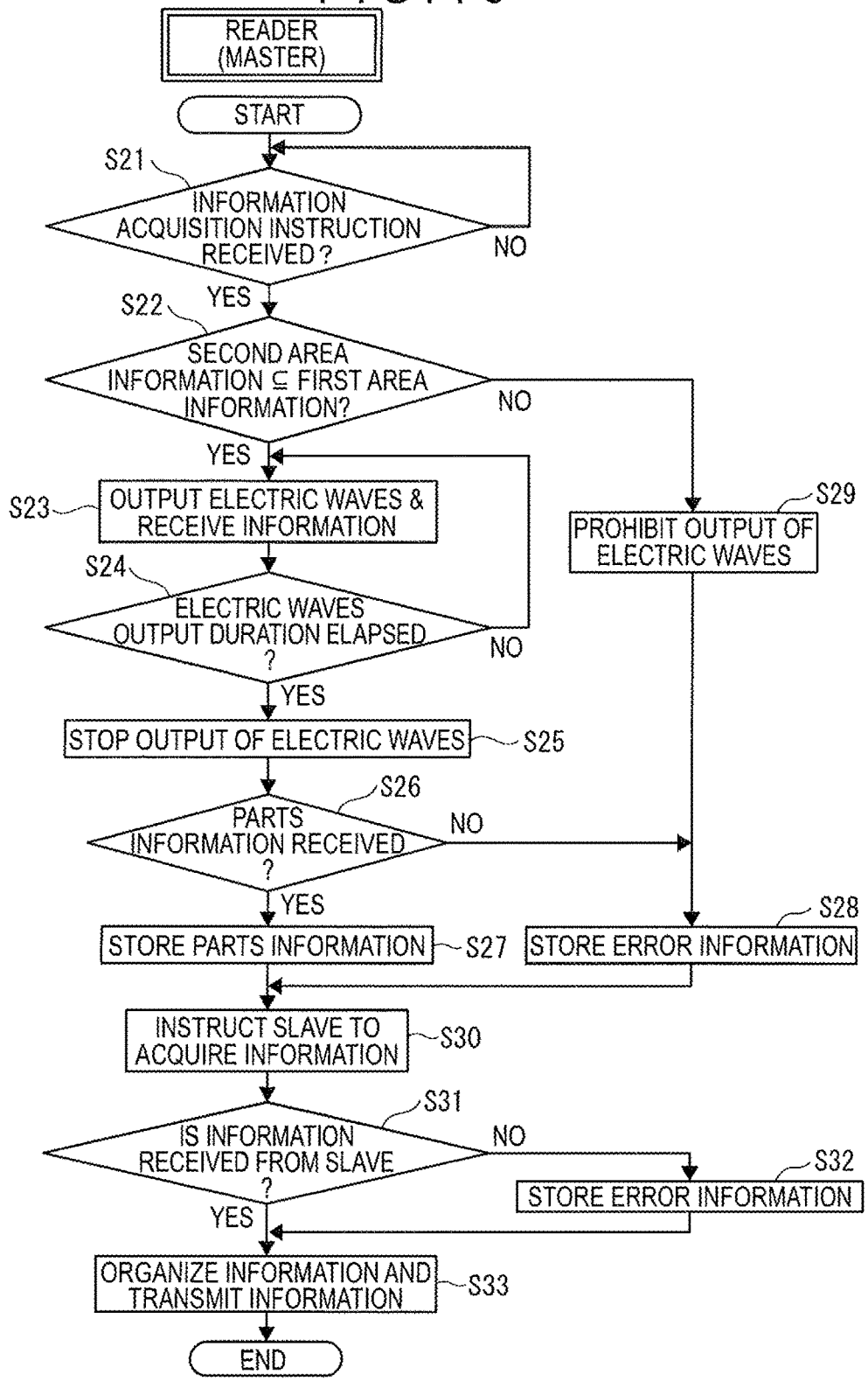
FIG. 10 is a flow chart showing an information acquisition process of the reader (master).
Figure 11:
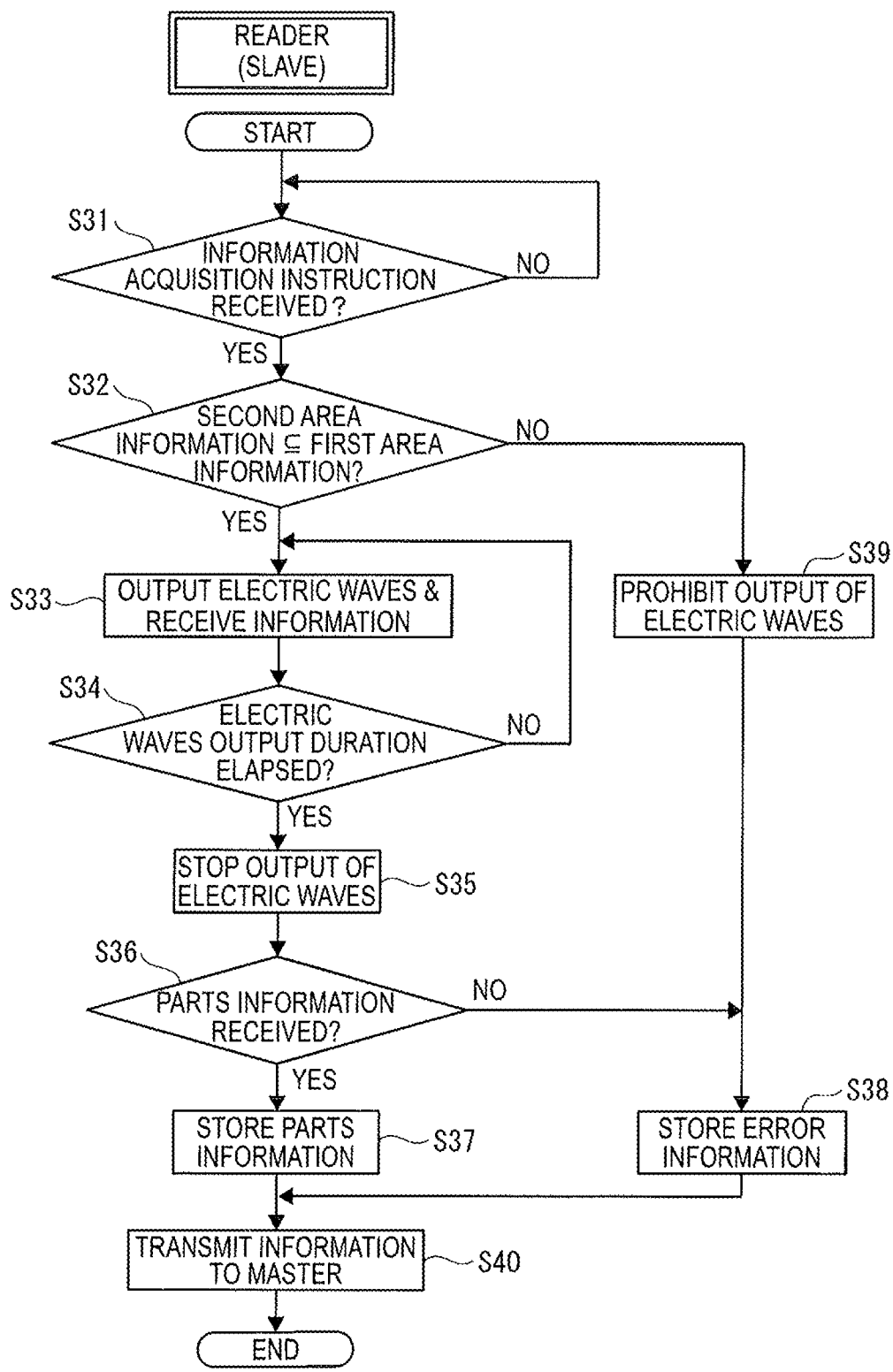
FIG. 11 is a flow chart showing an information acquisition process of the reader (slave).

Next, the information acquisition process S20 will be described with reference to FIGS. 10 and 11. Since two readers 15 are provided in the exemplary embodiment, FIG. 10 shows an information acquisition process by the reader 15A and FIG. 11 shows an information acquisition process by the reader 15B.

Information Acquisition Process of Master Reader

After powered ON by the key switch of the engine EG, the reader 15A judges whether or not the information acquisition instruction to acquire the parts information is received from the second communication control unit 205 (Step S21). This judgment process is repeated until the information acquisition instruction is received.

When the instruction judging unit 151 receives the information acquisition instruction and judges Yes in Step S21, the comparing unit 155 of the reader 15A judges whether the second area information, which is received together with the information acquisition instruction from the communication controller 200, is contained in the first area information stored in the first area information storage 158 (Step S22). In other words, when a piece of data is registered in the first area information, the comparing unit 155 judges whether or not the first area information is the same as the second area information. When a plurality of data are registered in the first area information, the comparing unit 155 judges whether or not the second area information is contained in the plurality of data of the first area information. When the current position detector 209 is provided, the current position detector 209 detects a current position and the current position may be set as the second area information. Before the second area information storage 204 stores the second area information or without storing the second area information, the comparing unit 155 may compare the first area information with the second area information and judge whether or not the second area information is contained in the first area information stored in the first area information storage 158. With this arrangement, when the engine EG is started, on a regular basis (e.g., at a predetermined time in a day) or according to the operational instruction from the operator and the administrator of the management center 110, the second area information is acquired based on the current portion detected by the current position detector 209 and the output of the electric waves can be prohibited in an unauthorized area. When the first area information is compared with the second area information by the comparing unit 155 without storing the second area information, the second area information storage 204 is not necessarily provided.

When the second area information is included in the first area information, the comparing unit 155 judges Yes in Step S22. In this case, the information receiving unit 152 outputs the electric waves to the identification device 30 and receives the information from the identification device 30 receiving the electric waves from the information receiving unit 152 (Step S23). Since the pump room 5A1 is separated from the engine room 5A2 by the partition 5A3, the electric waves outputted from the reader 15A are received by the identification devices 30A and 30B.

In each of the identification devices 30A and 30B, the IC tag 301 is activated when receiving the electric waves from the reader 15A and outputs the electric waves (reflection waves) toward the reader 15A. Accordingly, the reader 15A can receive information from the IC tag 301.

Judgment on Elapse of Electric Wave Output Duration

The reader 15A judges elapse of an electric wave output duration after the output of the electric waves is started (Step S24). Here, the electric wave output duration is set based on the aforementioned reading time set according to the acquiring conditions. The electric wave output duration of the exemplary embodiment is 30 seconds that is a time required for a single reader 15A to acquire the information of the identification device 30.

While the judgment is No in Step S24 before the elapse of the electric wave output duration, the information receiving unit 152 of the reader 15A continues the process of Step S23.

On the other hand, when the judgment is Yes in Step S24 after the elapse of the electric wave output duration, the information receiving unit 152 stops the output of the electric waves (Step S25). The reception judging unit 153 of the reader 15A judges whether or not the parts information is received (Step S26).

When the parts information is received, the reception judging unit 153 judges Yes in Step S26. In this case, the reception judging unit 153 associates the received parts information with the date data when the information is acquired and stores both of the information in the receiving information storage 159 (Step S27).

On the other hand, when the parts information is not received, the reception judging unit 153 judges No in Step S26. In this case, the reception judging unit 153 associates error information with the date data when the information is acquired and stores both of the information in the receiving information storage 159 (Step S28).

When the second area information is not included in the first area information, the comparing unit 155 judges No in Step S22. In this case, the communication control unit 156 prohibits the information receiving unit 152 from outputting the electric waves (Step S29). The communication control unit 156 associates error information indicating that the second area information is not included in the first area information with the current date data and stores both of the information in the receiving information storage 159 (Step S28).

After the processes of Steps S27 and S28, the slave control unit 157 of the reader 15A outputs the information acquisition instruction (instruction command) to the reader 15B (Step S30).

The slave control unit 157 judges whether or not the information transmitted from the reader 15B connected via the in-vehicle network 210 is received (Step S31).

When the information (parts information or error information) transmitted from the reader 15B is received, the slave control unit 157 stores the information in the receiving information storage 159 and judges Yes in Step S31.

On the other hand, since the reading time is also set at 30 seconds in the reader 15B the slave control unit 157 judges No in Step S31 when the information is not transmitted from the reader 15B even after the elapse of 30 seconds after the output of the information acquisition instruction in Step S30.

When the judgment is No in Step S31, the slave control unit 157 stores in the receiving information storage 159 error information indicating no reception of the information from the reader 15B (Step S32).

When the judgment is Yes in Step S31, subsequent to the process in Step S32, the information transmitter 154 organizes the information stored in the receiving information storage 159 and transmits the organized information to the communication controller 200 (Step S33). In other words, the parts information that is transmitted and successfully acquired from the reader 15A is stored in the receiving information storage 159 and/or the parts information that is transmitted from the reader 15B and is successfully acquired is stored in the receiving information storage 159. At this time, there is a possibility that both of the readers 15A and 15B receive the same parts information. When two IC tags 301 are provided to each of the identification devices 30A, 30B and 30C, the reader 15A possibly acquires the same parts information and the reader 15B possibly acquires the same parts information. When the same parts information is acquired, the information transmitter 154 performs an organizing process of deleting the parts information having the same contents except for a piece of the parts information having the same contents.

Information Acquisition Process of Slave Reader

The reader 15B serving as the slave reader performs Steps S31 to SA39, which are the same as Steps S21 to S29, and Step S40 as shown in FIG. 11, when the engine EG is powered on by the key switch.

Specifically, the instruction judging unit 151 of the reader 15B judges whether or not the information acquisition instruction to acquire the parts information is received from the slave control unit 157 of the reader 15A (Step S31). This judgment process is repeated until the information acquisition instruction is received.

Here, when the instruction judging unit 151 receives the information acquisition instruction and judges Yes in Step S31 the comparing unit 155 of the reader 15B judges whether the second area information, which is received together with the information acquisition instruction from the communication controller 200 via the reader 15A, is contained in the first area information stored in the first area information storage 158 (Step S32).

When the second area information is included in the first area information, the comparing unit 155 of the reader 15B judges Yes in Step S32. In this case, the information receiving unit 152 of the reader 15B outputs the electric waves to the identification device 30 and receives the information from the identification device 30 receiving the electric waves (Step S33). The electric waves outputted from the reader 15B are received by the identification devices 30C and 30D.

In the identification devices 30C and 30D, the IC tag 301 is activated when receiving the electric waves from the reader 15B and outputs the electric waves (reflection waves) toward the reader 15B. Accordingly, the reader 15B can receive information from the IC tag 301.

Judgment on Elapse of Electric Wave Output Duration

The reader 15B judges elapse of the electric wave output duration after the output of the electric waves is started (Step S34). The electric wave output duration is the same as in Step S24. The electric wave output duration of the exemplary embodiment is 30 seconds that is a time required for a single reader 15B to acquire the information of the identification device 30.

While the judgment is No in Step S34 before the elapse of the electric wave output duration, the information receiving unit 152 of the reader 15B continues the process of Step S33.

On the other hand, when the judgment is Yes in Step S34 after the elapse of the electric wave output duration, the information receiving unit 152 stops the output of the electric waves (Step S35). The reception judging unit 153 of the reader 15B judges whether or not the parts information is received (Step S36).

When the parts information is received, the reception judging unit 153 of the reader 15B judges Yes in Step S36. In this case, the reception judging unit 153 of the reader 15B associates the received parts information with the date data when the information is acquired and stores both of the information in the receiving information storage 159 (Step S37).

When the parts information is not received, the reception judging unit 153 judges No in Step S26. In this case, the reception judging unit 153 of the reader 15B associates error information with the date data when the information is acquired and stores both of the information in the receiving information storage 159 of the reader 15B (Step S38).

When the second area information is no included in the first area information, the comparing unit 155 of the reader 15B judges No in Step S32. In this case, the communication control unit 156 of the reader 15B prohibits the information receiving unit 152 from outputting the electric waves (Step S39). The communication control unit 156 associates error information indicating that the second area information is not included in the first area information with the current date data and stores both of the information in the receiving information storage 159 of the reader 15B (Step S38).

After the processes of Steps S37 and S38, the information transmitter 154 of the reader 15B transmits to the master reader 15A the information (parts information and error information) stored in the receiving information storage 159 of the reader 15B (Step S40).

When two IC tags 301 are provided to the identification device 30C, the reader 15B possibly acquires the same parts information. In this case, the information transmitter 154 may perform the organizing process of deleting the parts information having the same contents except for a piece of the parts information having the same contents. Alternatively, since the reader 15A performs the organizing process, the reader 15B may transmit the parts information having the same contents without performing the organizing process.

By this step, the parts information acquisition process in the reader 15B ends. As described above, when the reader 15A transmits the information to the communication controller 200 in Step S33 of FIG. 10, the information acquisition process S20 of FIG. 9 ends.

Information Acquisition Process of Communication Controller

In Step S13 of FIG. 9, the second reception judging unit 206 of the communication controller 200 judges whether or not the information transmitted from the reader 15 (15A) (error information or transmission information) is received.

When the information transmitted from the reader 15 is received, the second reception judging unit 206 judges Yes in Step S13. In this case, the information identification judging unit 207 of the communication controller 200 judges whether or not the acquired parts information (pans information contained in the transmission information received from each of the identification devices 30) is the same as the parts information already stored in the information storage 220 (Step S14).

When the acquired parts information is the same as the parts information stored in the information storage 220, the information identification judging unit 207 judges Yes in Step S14 and the communication controller 200 finishes the information collection process.

When the parts information is changed and when the error information is received instead of the parts information, the information identification judging unit 207 judges No in Step S14. When it is judged that the acquired parts information and the stored parts information are not the same, the second information transmitter 208 performs the information transmission process SB of transmitting the acquired parts information and error information to the management server 111.

When the second reception judging unit 206 of the communication controller 200 judges No in Step S13 since the information transmitted from the reader 15 is not received, in other words, when the information is not transmitted from the reader 15 even after the elapse of the electric wave output duration after the information acquisition instruction is transmitted in Step S12, there is a possibility that some malfunction such as a failure or disconnection occurs in the reader 15 and/or the in-vehicle network 210. Accordingly, the second information transmitter 208 performs the information transmission process SB for transmitting to the management center 110 the error information indicating no reception of the information from the reader 15.

Figure 12:
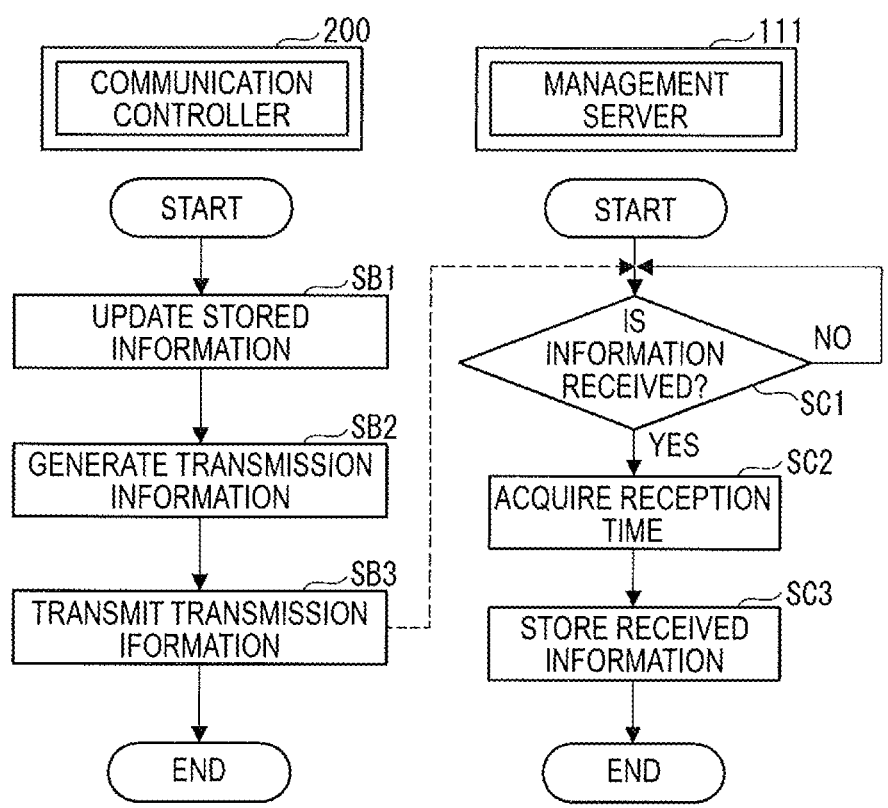
FIG. 12 is a flow chart showing an information transmission process conducted between the communication controller and a management server.

FIG. 12 is a flowchart showing the information transmission process SB to be performed by the second information transmitter 208 of the communication controller 200 and the information storage process SC to be performed by the management server 111.

In the information transmission process SB, when the parts information is newly acquired, the communication controller 200 updates the parts information already stored in the information storage 220 with the newly acquired parts information as shown in FIG. 12 (Step SB1). At this time, when the parts information of all the identification devices 30 is already acquired from the reader 15, the communication controller 200 may update all the parts information already stored in the information storage 220 with the newly acquired information. Alternatively, when the acquired parts information is different from the parts information already stored in the information storage 220, only the parts information judged different may be updated with the newly acquired parts information. Moreover, as described above, when some of the parts information acquired from the reader 15 is different from the parts information already stored in the information storage 220, the parts information already stored in the information storage 220 and judged to be different may be held in the information storage 220 without being immediately deleted or updated and may be deleted later. Moreover, the currently acquired parts information may be displayed on the display device 2131 of the monitor 213. Further, when the error information is acquired, the monitor 213 or the like may issue an alarm message indicating occurrence of the error information and contents thereof.

Next, the communication controller 200 generates the transmission information for transmitting the acquired information to the management server 111 (Step SB2). The transmission information contains the parts information judged different and the error information and the above date data relating to those information. All the newly acquired information (the information received from the reader 15A) may be contained in the transmission information.

Subsequently, the communication controller 200 transmits the generated transmission information to the management server 111 via the communication network 120 (Step SB3).

By this step, the information transmission process SB in the hydraulic excavator 1 ends.

The management server 111 performs the information storage process SC described below.

In the information storage process SC, as shown in FIG. 12, the management server 111 repeats the judgment process of judging whether or not the transmission information is received from a predetermined working vehicle (e.g., the hydraulic excavator 1) (Step SC1).

When it is judged that the transmission information is received (Step SC1, Yes), the management server 111 acquires a date (time and date) when the transmission information is received (Step SC2).

Subsequently, the management server 111 extracts the parts information and the error information from the received transmission information and stores these information and the date acquired in Step SC2 in a manner associated with each other (Step SC3). At this time, after executing the same judgment process in Step S14, the parts information different from the previously acquired parts information and the error information may be reported to the administrator of the management server 111.

By this step, the information storage process SC in the management server 111 ends. In other words, the information collection process in the parts information management system 100 ends.

In the exemplary embodiment, as described above, the information of the identification device 30 may be collected at the timing other than/in addition to the start of the engine EG, on a regular basis (e.g., a predetermined time in a day) or according to the operational instruction from the operator or the administrator of the management center 110. In this case, a process for judging whether or not it reaches an information collection time (timing) or whether or not the operational instruction of information collection is given may be added in the flow instead of Step S11 of FIG. 9. When it reaches the information collection time or when the operational instruction of information collection is given, the processes of Step S12 and subsequent Steps in FIG. 9 are performed.

Further, the communication controller 200 may display the second area information stored in the second area information storage 204 on the display device 2131 so that the operator and the maintenance engineer can check the setting of the area where the hydraulic excavator 1 is used. At this time, since the second area information is indicated by numerals, it is difficult for the operator or the like to recognize the second area information. For this reason, the second area information displayed on the display device 2131 is preferably displayed with recognizable information to the operator, for instance, a name or the like of a country where the second area information is applied. In this arrangement, the operator and the maintenance engineer can easily judge whether or not the current second area information is correctly set.

Moreover, the communication controller 200 may receive the first area information from the readers 15A and 15B and display the first area information on the display device 2131. Also in this arrangement, the first area information displayed on the display device 2131 is preferably displayed with recognizable information to the operator, for instance, a name or the like of a country where the use of the reader 15 is permitted. In this arrangement, the operator and the maintenance engineer can easily judge in which country the readers 15A and 15B provided in the hydraulic excavator 1 are usable.

Accordingly, by displaying the first area information and the second area information on the display device 2131, the operator and the like can easily check in which area the readers 15A and 15B are usable and whether or not the displayed area is the same as the area where the hydraulic excavator 1 is currently used. Accordingly, even when the setting is not appropriate, a countermeasure such as a correct resetting of the area where the hydraulic excavator 1 is used, replacement of the readers 15A and 15B with readers 15A and 15B usable in the area where the hydraulic excavator 1 is used, and replacement of the parts forming the readers 15A and 15B can be rapidly performed.

According to the above described hydraulic excavator 1 and the parts information management system 100 in the exemplary embodiment, the following advantages can be attained.

The output of the electric waves by the reader 15 is permitted only when the second area information is included in the first area information based on a comparison between the first area information indicating the area (country) where the use of the hydraulic excavator 1 is permitted, in other words, when the area where the hydraulic excavator 1 is currently used (second area information) is the same as the area where the use of the reader 15 is permitted (first area information). Accordingly, by correctly setting the area where the hydraulic excavator 1 is used as the second area information in the second area information storage 204, the output of the electric waves can be reliably prevented in the area where the use of the reader 15 is not permitted.

Moreover, by setting the service mode, a register operation of the second area information in the second area information storage 204 can be conducted only by the maintenance engineer. Accordingly, the operator of the hydraulic excavator 1 can operate the reader 15 only in a permitted area without a complicated setting operation.

Further, when the comparing unit 155 judges that the second area information is not included in the first area information, the error information is transmitted to the communication controller 200. Accordingly, attachment of the reader 15 that is not permitted to be used in a current area where the hydraulic excavator 1 is used can be easily reported to the operator and the maintenance engineer, for instance, by the display on the display device 2131 of the monitor 213. Further, the above unpermitted attachment of the reader 15 can also be reported to the administrator of the management center 110 by communicating with the management server 111 via the communication controller 200.

Accordingly, an appropriate countermeasure such as replacement of the reader 15 by a reader 15 suitable to the area where the hydraulic excavator 1 is used or replacement of the parts forming the reader 15 can be rapidly conducted.
Modification(s)

The scope of the invention is not limited to the above exemplary embodiment but includes modifications and improvements to the extent that an object of the invention can be achieved.

In the exemplary embodiment, the comparing unit 155 for comparing and judging the first area information and the second area information and the communication control unit 156 for prohibiting the output of the electric waves based on the judgment result of the comparing unit 155 are provided to the reader 15, but may be provided to the communication controller 200 of the hydraulic excavator 1. Specifically, only when the first area information is read out from the first area information storage 158 and the second area information is included in the first area information, the communication controller 200 transmits the information acquisition instruction to the reader 15. When the second area information is not included in the first area information, the information acquisition instruction is not transmitted. Thus, the output of the electric waves may be prohibited.

In the above exemplary embodiment, the communication controller 200 transmits the transmission information, which contains the parts information received from the identification device 30, to the management server 111 of the management center 110 via the communication network 120. However, the target component to which the identification device 30 is attached is not limited to the above. Specifically, the communication controller 200 does not necessarily transmit the parts information to the management server 111. In this case, for instance, the communication controller 200 may display the acquired parts information and the error information on the monitor 213, whereby the operator may grasp the parts information, and furthermore, conditions of the components.

The communication controller 200 does not necessarily include the current position detector 209. However, with the current position detector 209, the second area information corresponding to the current position data detected by the current position detector 209 can be acquired from the management center 110 and the like and stored in the second area information storage 204.

In the above exemplary embodiment, the communication controller 200 performs the judgment process of whether or not the parts information acquired by each of the readers 15 is the same as the already stored parts information (parts information previously acquired). However, the target component to which the identification device 30 is attached is not limited to the above. For instance, each of the readers 15 may store the previously received parts information, may judge whether or not the stored parts information is the same as the newly received parts information, and may transmit the judgment results to the communication controller 200. In this case, when the previously received parts information does not contain the parts information newly received from each of the identification device 30, the readers 15 judge that the new received parts information and the previous parts information are not the same.

In the above exemplary embodiment, each of the identification devices 30A, 30B, 30C and 30D includes one IC tag 301. However, the number of the IC tag 301 provided to each of identification devices 30A, 30B, 30C and 30D is not limited to the above. In other words, two or more IC tags 301 may be provided to each of identification devices 30A, 30B, 30C and 30D. Moreover, the number of the identification device 30 of the working vehicle is also appropriately changeable.

In the above exemplary embodiment, the identification devices 30A, 30B and 30C are respectively provided to the filters 20A, 20B and 20C, and the identification device 30D is provided to the engine EG. However, the target component to which the identification device 30 is provided is not limited to the above. The target component to which the identification device 30 may be appropriately changeable. The identification device 30 may be provided to any component (including any device) configuring the working vehicle irrespective of whether the target component is a replacement component or not.

The invention claimed is:

1. A communication system provided to a working vehicle, comprising:
   an information receiving unit that outputs electric waves to communicate with an identification device in which identification information is stored, and receives the identification information;
   a first area information storage that stores a first area information indicating an area where a use of the information receiving unit is permitted;
   a comparing unit that compares the first area information with a second area information indicating the area where the working vehicle is used; and
   a communication control unit that prohibits the information receiving unit from outputting the electric waves when the comparing unit judges that the second area information is not included in the first area information.

2. The communication system according to claim 1, wherein
   when an instruction to acquire the identification information is inputted, the comparing unit judges whether or not the second area information is included in the first area information stored in the first area information storage,
   the communication control unit permits the information receiving unit to output the electric waves when the comparing unit judges that the second area information is included in the first area information, and
   the communication control unit prohibits the information receiving unit from outputting the electric waves when the comparing unit judges that the second area information is not included in the first area information.

3. The communication system according to claim 1, further comprising:
   an input device that selects a service mode in which a maintenance of the working vehicle is performed, wherein
   the second area information is inputted using the input device with the service mode being selected.

4. The communication system according to claim 1, further comprising:
   a current position detector that detects the area where the working vehicle is used, wherein the second area information is set based on the area detected by the current position detector.

5. The communication system according to claim 1, wherein
the working vehicle comprises: a communication device; and an instructing unit that instructs the communication device to acquire the identification information,
the communication device comprises: an instruction judging unit that receives and judges the instruction to acquire the identification information; the information receiving unit; the first area information storage; the comparing unit; the communication control unit; and an information transmitter that transmits the acquired identification information, and
the instructing unit comprises: a second area information storage that stores the second area information; a second communication control unit that outputs the instruction to acquire the identification information and the second area information to the communication device; and a second reception judging unit that judges whether or not the information is received from the communication device.

6. The communication system according to claim 5, wherein
the communication device of the working vehicle comprises a first communication device and a second communication device,
the first communication device further comprises a second communication device control unit that controls the second communication device,
the second communication control unit of the instructing unit outputs the instruction to acquire the identification information and the second area information to the first communication device,
the second communication device control unit of the first communication device outputs the instruction to acquire the identification information, which is outputted from the instructing unit, and the second area information to the second communication device, and
the second communication device comprises an information transmitter that transmits the information to the first communication device.

7. A working vehicle comprising the communication system according to claim 1.

8. A communication system provided to a hydraulic excavator, comprising:
an information receiving unit that outputs electric waves to communicate with an IC tag in which identification information is stored and receives the identification information;
a first area information storage that stores a first area information indicating an area where a use of the information receiving unit is permitted;
a second area information storage that stores a second area information indicating an area where the hydraulic excavator is used;
a comparing unit that compares the first area information with the second area information; and
a communication control unit that permits the information receiving unit to output the electric waves when the comparing unit judges that the second area information is included in the first area information and prohibits the information receiving unit from outputting the electric waves when the comparing unit judges that the second area information is not included in the first area information.

* * * * *